(12) United States Patent
Desai et al.

(10) Patent No.: US 11,392,843 B2
(45) Date of Patent: Jul. 19, 2022

(54) UTILIZING A MACHINE LEARNING MODEL TO PREDICT A QUANTITY OF CLOUD RESOURCES TO ALLOCATE TO A CUSTOMER

(71) Applicant: Accenture Global Solutions Limited, Dublin (IE)

(72) Inventors: Vijay Desai, San Diego, CA (US); Kun Qiu, San Diego, CA (US); Suraj Thulkar, Nagpur (IN); Laser Seymour Kaplan, San Diego, CA (US); Daniel Marcus Lombardo, San Diego, CA (US)

(73) Assignee: Accenture Global Solutions Limited, Dublin (IE)

( * ) Notice: Subject to any disclaimer, the term of this patent is extended or adjusted under 35 U.S.C. 154(b) by 387 days.

(21) Appl. No.: 16/551,309

(22) Filed: Aug. 26, 2019

(65) Prior Publication Data

US 2020/0311573 A1 Oct. 1, 2020

(30) Foreign Application Priority Data

Apr. 1, 2019 (IN) .............................. 201941013177

(51) Int. Cl.
*G06N 5/04* (2006.01)
*G06N 20/00* (2019.01)
(Continued)

(52) U.S. Cl.
CPC ............... *G06N 5/04* (2013.01); *G06N 20/00* (2019.01); *G06Q 10/06315* (2013.01);
(Continued)

(58) Field of Classification Search
CPC ..... H04L 41/147; H04L 67/10; H04L 67/303; H04L 41/16; H04L 67/30; H04L 47/826; H04L 47/823; H04L 47/822; H04L 47/76
See application file for complete search history.

(56) References Cited

U.S. PATENT DOCUMENTS

| 2010/0088205 | A1* | 4/2010 | Robertson | ............ G06Q 20/102 |
| | | | | 705/400 |
| 2014/0074641 | A1* | 3/2014 | Wang | ..................... G06Q 30/08 |
| | | | | 718/103 |

(Continued)

OTHER PUBLICATIONS

Extended European Search Report for Application No. EP20165073. 6, dated Jul. 15, 2020, 9 pages.

*Primary Examiner* — El Hadji M Sall
(74) *Attorney, Agent, or Firm* — Harrity & Harrity, LLP

(57) ABSTRACT

A device may receive historical cloud data associated with resources of a cloud computing environment, and may receive historical customer data associated with requested resource usage by customers of the cloud computing environment. The device may determine a usage growth profile based on the historical cloud data and the historical customer data, and may determine, based on the historical cloud data and the historical customer data, usage deviation data indicating deviations between actual and planned resource usage. The device may train a model, with the usage growth profile and the usage deviation data, to generate a trained model, and may receive a request for new resource usage by a customer associated with the cloud computing environment. The device may process the request for the new resource usage, with the trained model, to generate projected resource usage data, and may perform actions based on the projected resource usage data.

20 Claims, 12 Drawing Sheets

(51) Int. Cl.
　　　*G06Q 10/06*　　　(2012.01)
　　　*H04L 47/76*　　　(2022.01)
　　　*H04L 41/147*　　(2022.01)
　　　*H04L 67/303*　　(2022.01)
　　　*H04L 67/10*　　　(2022.01)

(52) U.S. Cl.
　　　CPC ............ *H04L 41/147* (2013.01); *H04L 47/76* (2013.01); *H04L 67/10* (2013.01); *H04L 67/303* (2013.01)

(56) References Cited

U.S. PATENT DOCUMENTS

| | | | |
|---|---|---|---|
| 2015/0046279 A1* | 2/2015 | Wang | G06F 9/5027 705/26.3 |
| 2016/0094410 A1* | 3/2016 | Anwar | H04L 67/1097 709/223 |
| 2016/0379125 A1 | 12/2016 | Bordawekar et al. | |
| 2017/0006135 A1* | 1/2017 | Siebel | H04L 67/12 |
| 2017/0344400 A1 | 11/2017 | Birke et al. | |

\* cited by examiner

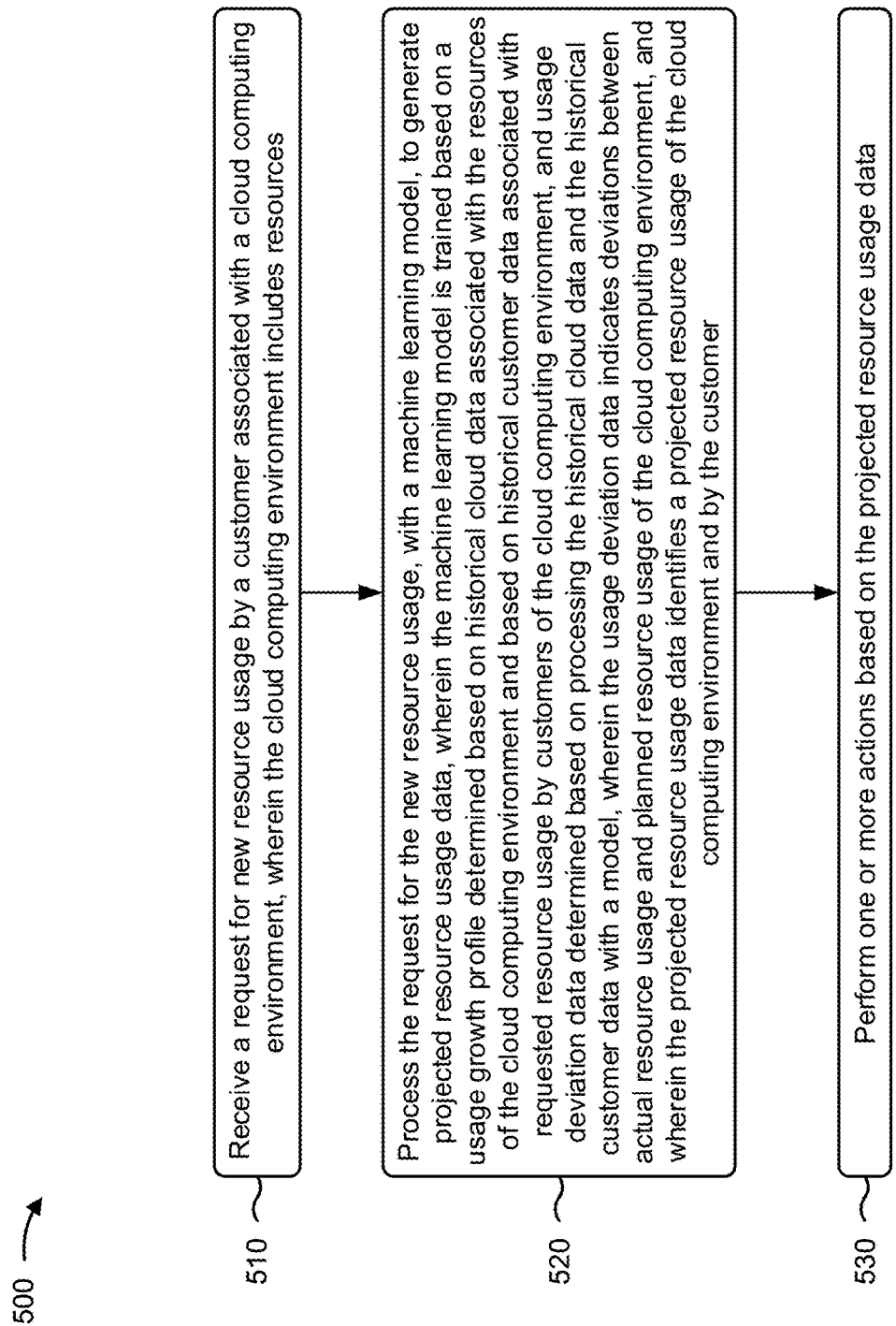

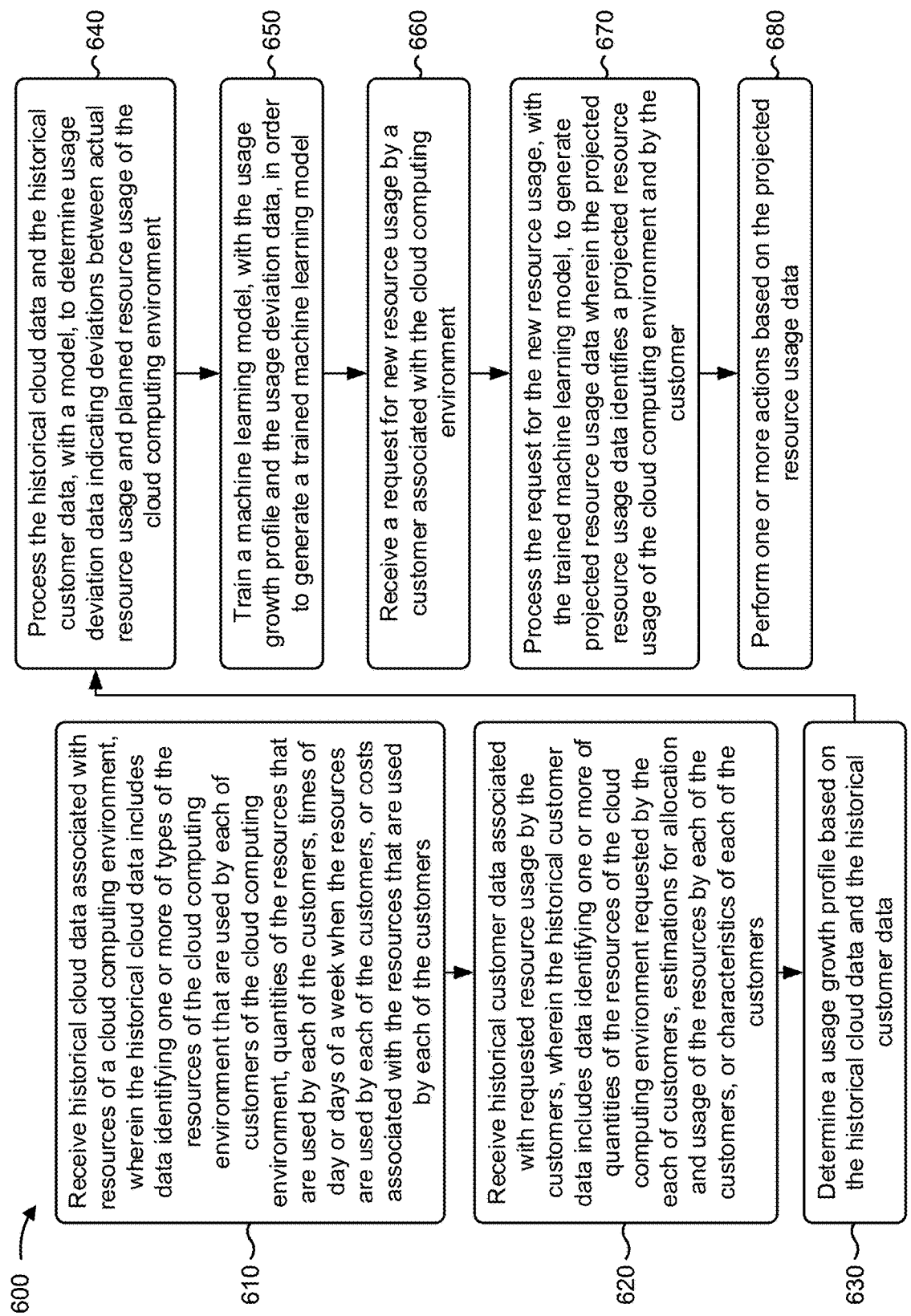

UTILIZING A MACHINE LEARNING MODEL TO PREDICT A QUANTITY OF CLOUD RESOURCES TO ALLOCATE TO A CUSTOMER

RELATED APPLICATION

This application claims priority to Indian Patent Application No. 201941013177, filed on Apr. 1, 2019, and entitled "CLOUD RESOURCE PREDICTION PLATFORM," the content of which is incorporated by reference herein in its entirety.

BACKGROUND

Cloud computing may provide an on-demand availability of computing resources, especially data storage and computing power, without direct active management by a user. Large cloud computing environments often have functions distributed over multiple locations from central servers. A cloud computing environment may be limited to a single organization (e.g., referred to as an enterprise cloud), may be available to several organizations (e.g., referred to as a public cloud), or may be a combination of both (e.g., referred to as a hybrid cloud).

SUMMARY

According to some implementations, a method may include receiving historical cloud data associated with resources of a cloud computing environment, and receiving historical customer data associated with requested resource usage by customers of the cloud computing environment. The method may include determining a usage growth profile based on the historical cloud data and the historical customer data, and determining, based on the historical cloud data and the historical customer data, usage deviation data indicating deviations between actual resource usage and planned resource usage of the cloud computing environment. The method may include training a machine learning model, with the usage growth profile and the usage deviation data, to generate a trained machine learning model, and receiving a request for new resource usage by a customer associated with the cloud computing environment. The method may include processing the request for the new resource usage, with the trained machine learning model, to generate projected resource usage data, wherein the projected resource usage data identifies a projected resource usage of the cloud computing environment and by the customer, and performing one or more actions based on the projected resource usage data.

According to some implementations, a device may include one or more memories, and one or more processors to receive a request for new resource usage by a customer associated with a cloud computing environment, wherein the cloud computing environment includes resources. The one or more processors may process the request for the new resource usage, with a machine learning model, to generate projected resource usage data. The machine learning model may be trained based on a usage growth profile determined based on historical cloud data associated with the resources of the cloud computing environment and based on historical customer data associated with requested resource usage by customers of the cloud computing environment, and usage deviation data determined based on processing the historical cloud data and the historical customer data, with a model. The usage deviation data may indicate deviations between actual resource usage and planned resource usage of the cloud computing environment. The projected resource usage data may identify a projected resource usage of the cloud computing environment and by the customer. The one or more processors may perform one or more actions based on the projected resource usage data.

According to some implementations, a non-transitory computer-readable medium may store one or more instructions that, when executed by one or more processors of a device, may cause the one or more processors to receive historical cloud data associated with resources of a cloud computing environment, wherein the historical cloud data includes data identifying one or more of types of the resources of the cloud computing environment that are used by each of customers of the cloud computing environment, quantities of the resources that are used by each of the customers, times of day or days of a week when the resources are used by each of the customers, or costs associated with the resources that are used by each of the customers. The one or more instructions may cause the one or more processors to receive historical customer data associated with requested resource usage by the customers, wherein the historical customer data includes data identifying one or more of quantities of the resources of the cloud computing environment requested by the each of customers, estimations for allocation and usage of the resources by each of the customers, or characteristics of each of the customers. The one or more instructions may cause the one or more processors to determine a usage growth profile based on the historical cloud data and the historical customer data, and process the historical cloud data and the historical customer data, with a model, to determine usage deviation data indicating deviations between actual resource usage and planned resource usage of the cloud computing environment. The one or more instructions may cause the one or more processors to train a machine learning model, with the usage growth profile and the usage deviation data, in order to generate a trained machine learning model, and receive a request for new resource usage by a customer associated with the cloud computing environment. The one or more instructions may cause the one or more processors to process the request for the new resource usage, with the trained machine learning model, to generate projected resource usage data, wherein the projected resource usage data identifies a projected resource usage of the cloud computing environment and by the customer, and perform one or more actions based on the projected resource usage data.

BRIEF DESCRIPTION OF THE DRAWINGS

FIGS. 4-6 are flow charts of example processes for utilizing a machine learning model to predict a quantity of cloud resources to allocate to a customer.

DETAILED DESCRIPTION

Figure 1A:
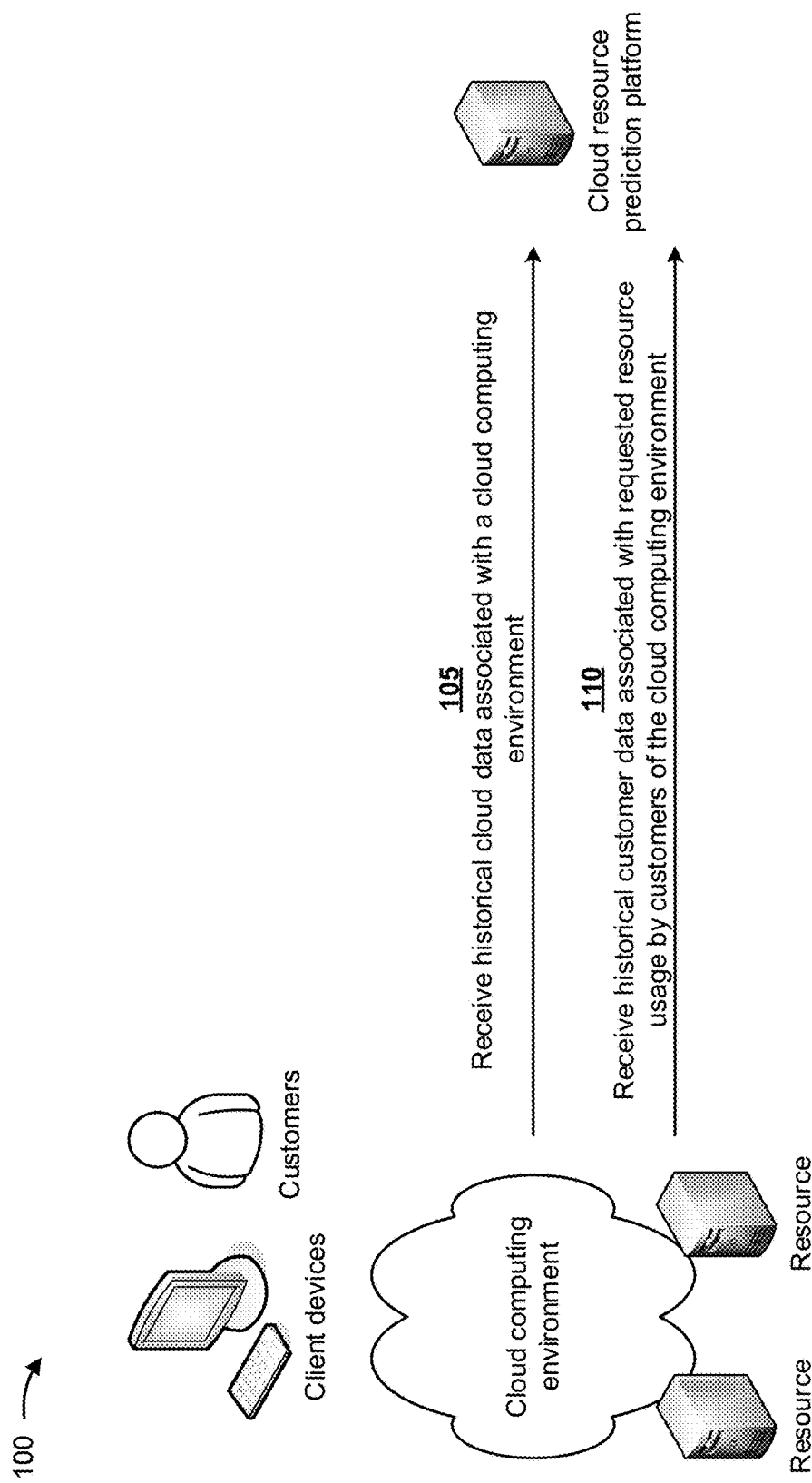
FIGS. 1A-1G are diagrams of one or more example implementations described herein.

The following detailed description of example implementations refers to the accompanying drawings. The same reference numbers in different drawings may identify the same or similar elements.

Some organizations utilize cloud-based computing resources for data processing, data storage, application hosting, and/or the like. Often, these computing resources are allocated to the organizations or for particular tasks on an as-needed or an as-requested basis. Monitoring computing resource usage in relation to historical usage and/or usage by similar organizations, for similar tasks, and/or the like is difficult due to having to analyze millions, billions, or more data points across thousands, millions, or more accounts. This results in poor management of computing resource usage and/or mis-allocation of computing resources, thereby wasting computing resources that could otherwise be allocated to other organizations and/or tasks, resulting in over-use of computing resources, inefficient allocation of computing resources, and/or the like. In addition, anomalous usage (e.g., over-usage, usage of an unexpected combination of computing resources, and/or the like) of computing resources can disrupt operations of an organization, can result in significant expense to the organization, and/or the like.

Some implementations described herein provide a cloud resource prediction platform that utilizes a machine learning model to predict a quantity of cloud resources to allocate to a customer (e.g., an organization). For example, the cloud resource prediction platform may receive historical cloud data associated with resources of a cloud computing environment, and may receive historical customer data associated with requested resource usage by customers of the cloud computing environment. The cloud resource prediction platform may determine a usage growth profile based on the historical cloud data and the historical customer data, and may determine, based on the historical cloud data and the historical customer data, usage deviation data indicating deviations between actual resource usage and planned resource usage of the cloud computing environment. The cloud resource prediction platform may train a machine learning model, with the usage growth profile and the usage deviation data, to generate a trained machine learning model, and may receive a request for new resource usage by a customer associated with the cloud computing environment. The cloud resource prediction platform may process the request for the new resource usage, with the trained machine learning model, to generate projected resource usage data, wherein the projected resource usage data identifies a projected resource usage of the cloud computing environment and by the customer, and may perform one or more actions based on the projected resource usage data.

In this way, the cloud resource prediction platform facilitates improved management of resources (e.g., processing resources, memory resources, networking resources, and/or the like) associated with a cloud computing environment. This reduces or eliminates over usage of the resources, thereby conserving the resources. In addition, this reduces or eliminates over allocation of resources, thereby reducing instances of idle or unused resources and improving a utilization efficiency of the resources. Further, improving management of resources through improved anomaly detection facilitates improved cost management with regard to the resources and improved planning with regard to future resource needs.

FIGS. 1A-1G are diagrams of one or more example implementations 100 described herein. As shown in FIG. 1A, a cloud computing environment may include resources (e.g., processing resources, memory resources, network resources, server devices, and/or the like) and may communicate with multiple client devices associated with customers. For example, the client devices may enable the customers to access the cloud computing environment to utilize the resources for performance of one or more tasks. The cloud computing environment may include the features described below in connection with FIG. 2. The cloud computing environment may also be associated with a cloud resource prediction platform. For example, the cloud resource prediction platform may be separate from but in communication with the cloud computing environment, may be implemented within the cloud computing environment, and/or the like.

As further shown in FIG. 1A, and by reference number 105, the cloud resource prediction platform may receive historical cloud data associated with the cloud computing environment. In some implementations, the cloud resource prediction platform may receive the historical cloud data from, for example, one or more of the client devices, one or more of the resources, and/or the like. The historical cloud data may include data identifying a usage of a set of resources associated with the customers (e.g., organizations). For example, the historical cloud data may include data identifying types of resources used by the customers, quantities of the resources used, times of day or days of the week when the resources are used, costs associated with the resources used by the customers (e.g., billing data), characteristics of the customers for which the computing resources were allocated (e.g., quantities of individuals associated with the customers, industries of the customers, locations of the customers, operating hours of the customers, and/or the like), and/or the like. In some implementations, the historical cloud data may include data identifying a migration plan for a customer with regard to resources. For example, the historical cloud data may include data identifying when resources are to be transitioned from non-cloud-based resources (e.g., server devices managed by the customer) to cloud-based resources (e.g., of the cloud computing environment), which types of resources are to be transitioned, whether the resources are to undergo an upgrade or a downgrade after being transitioned, and/or the like.

As further shown in FIG. 1A, and by reference number 110, the cloud resource prediction platform may receive historical customer data associated with requested resource usage by customers of the cloud computing environment. In some implementations, the cloud resource prediction platform may receive the historical customer data from, for example, one or more of the client devices, one or more of the resources, and/or the like. The historical customer data may include data identifying quantities of resources of the cloud computing environment requested by the customers (e.g., via the client devices), estimations for future allocation and/or usage of resources by the customers, and/or the like.

In some implementations, the cloud resource prediction platform may regularly receive the historical cloud data and/or the historical customer data from the cloud computing environment, may periodically receive the historical cloud data and/or the historical customer data from the cloud computing environment, and/or the like. The cloud resource prediction platform may store the historical cloud data and/or the historical customer data in a data structure (e.g., a database, a table, a list, and/or the like) associated with the cloud resource prediction platform. In some implementations, there may be hundreds, thousands, millions, and/or the like of resources that produce thousands, millions, billions, and/or the like of data points provided in the historical cloud data and/or the historical customer data. In this way, the cloud resource prediction platform may handle thousands, millions, billions, and/or the like of data points within a period of time (e.g., daily, weekly, monthly), and thus may provide "big data" capability.

Figure 1B:
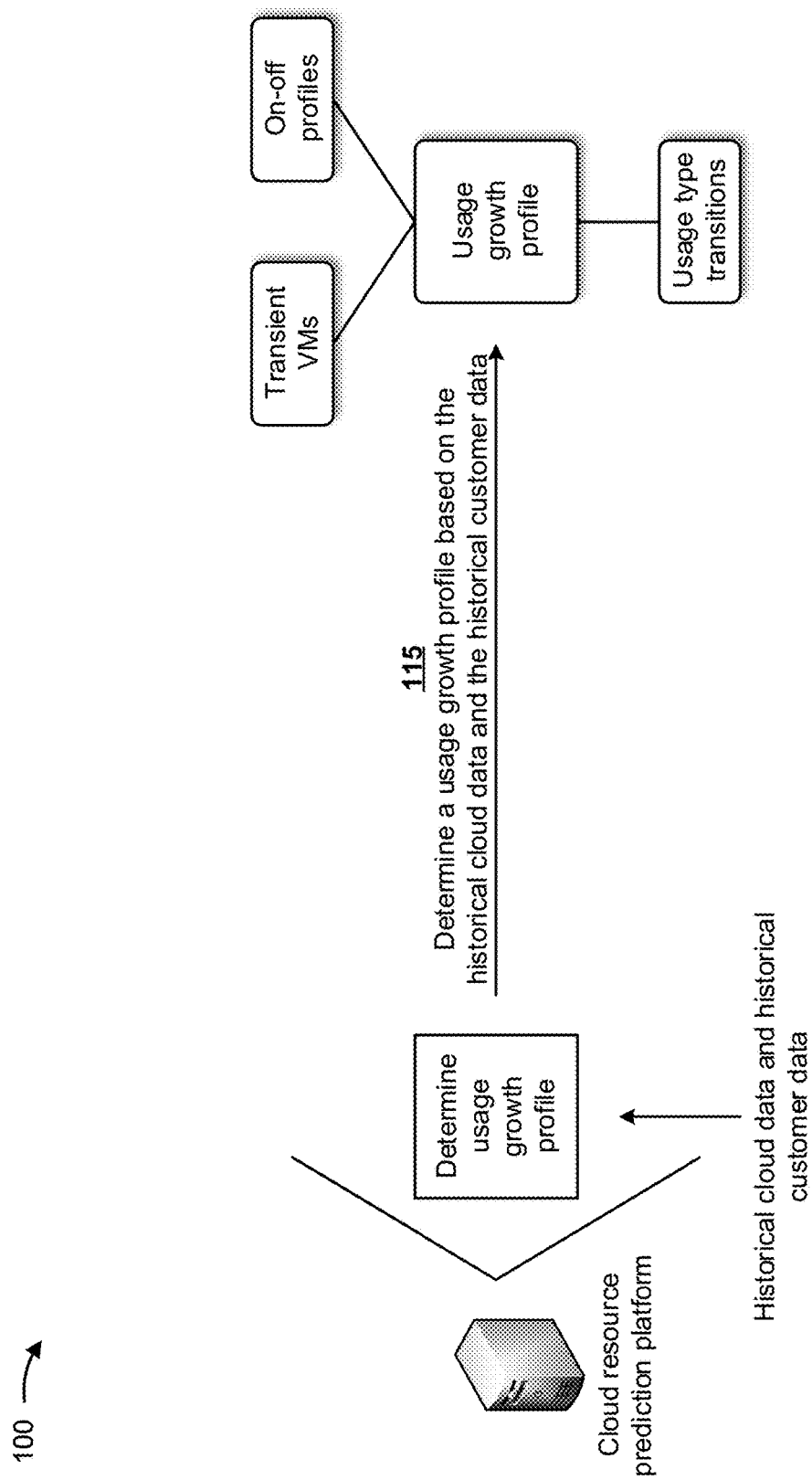

As shown in FIG. 1B, and by reference number 115, the cloud resource prediction platform may determine a usage growth profile (e.g., for the cloud computing environment) based on the historical cloud data and the historical customer data. For example, the cloud resource prediction platform may determine the usage growth profile after receiving the historical cloud data and the historical customer data, based on a request to determine the usage growth profile, and/or the like. A usage growth profile may include a set of groupings of the historical cloud data and the historical customer data (e.g., data groupings) based on a set of attributes included in the historical cloud data and the historical customer data. For example, the usage growth profile may organize the historical cloud data and the historical customer data by types of resources, by tasks for which resources are organized, by users of the resources, by costs associated with resources, and/or the like. In another example, the usage growth profile may group the historical cloud data and the historical customer data based on a quantity of transient virtual machines utilized by the customers (e.g., virtual machines utilized for a short period of time and which are unplanned), a quantity of virtual machines continuously being utilized (e.g., continuously on), a quantity of unutilized virtual machines (e.g., continuously off), a quantity of times virtual machines change from one customer to another customer (e.g., usage type transitions), and/or the like.

In some implementations, the usage growth profile may group the historical cloud data and the historical customer data based on characteristics of resource usage over time, such as historical amounts, trends, patterns, and/or the like. As specific examples, the usage growth profile may group the historical cloud data and the historical customer data based on characteristics of times that resources are brought online or taken offline, amounts of resources used at different times of the day, whether and/or when resources were upgraded or downgraded (e.g., in terms of processing power and/or capacity), and/or the like.

Figure 1C:
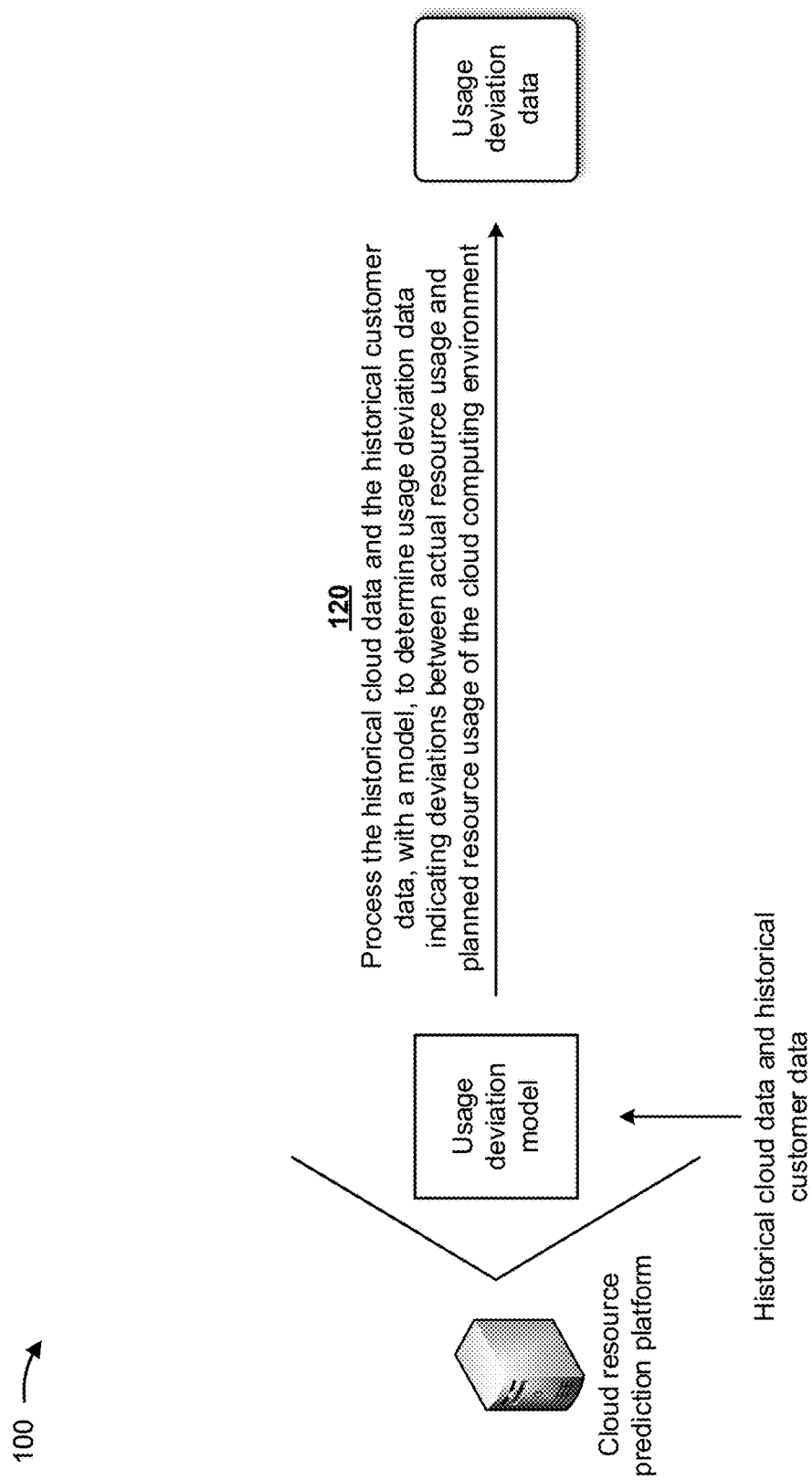

As shown in FIG. 1C, and by reference number 120, the cloud resource prediction platform may process the historical cloud data and the historical customer data, with a model, to determine usage deviation data indicating deviations between actual resource usage and planned resource usage of the cloud computing environment. In some implementations, the cloud resource prediction platform may determine the usage deviation data simultaneously with determination of the usage growth profile, prior to determination of the usage growth profile, after determination of the usage growth profile, and/or the like.

The model may include a non-parametric probability estimation model with Bayesian smoothing (e.g., a technique utilized to smooth categorical data). The non-parametric probability estimation model may be based solely on parametric families of probability distributions (e.g., parameters such as a mean and a variance), and may include a histogram model (e.g., a simple nonparametric estimate of a probability distribution), a kernel density estimation model, a non-parametric regression, and/or the like. In some implementations, the model may determine links between the historical customer data (e.g., quantities of resources of the cloud computing environment requested by the customers, estimations for allocation and/or usage of resources by the customers, and/or the like) and the historical cloud data (e.g., types of resources actually used by the customers, quantities of the resources actually used by the customers, and/or the like). The model then may determine deviations between corresponding (e.g., linked) historical customer data and historical cloud data. For example, the model may determine a deviation between a quantity of resources requested or estimated by a particular customer and the quantity of resources actually utilized by the particular customer.

In some implementations, the cloud resource prediction platform may utilize the model to determine a degree to which historical usage of resources matched a quantity of resources allocated, a quantity of resources requested, a quantity of resources predicted to be needed by a customer or for a task, and/or the like. As a specific example, the cloud resource prediction platform may utilize the model to identify deviations from an initial prediction of an amount of resources needed by a customer.

Figure 1D:
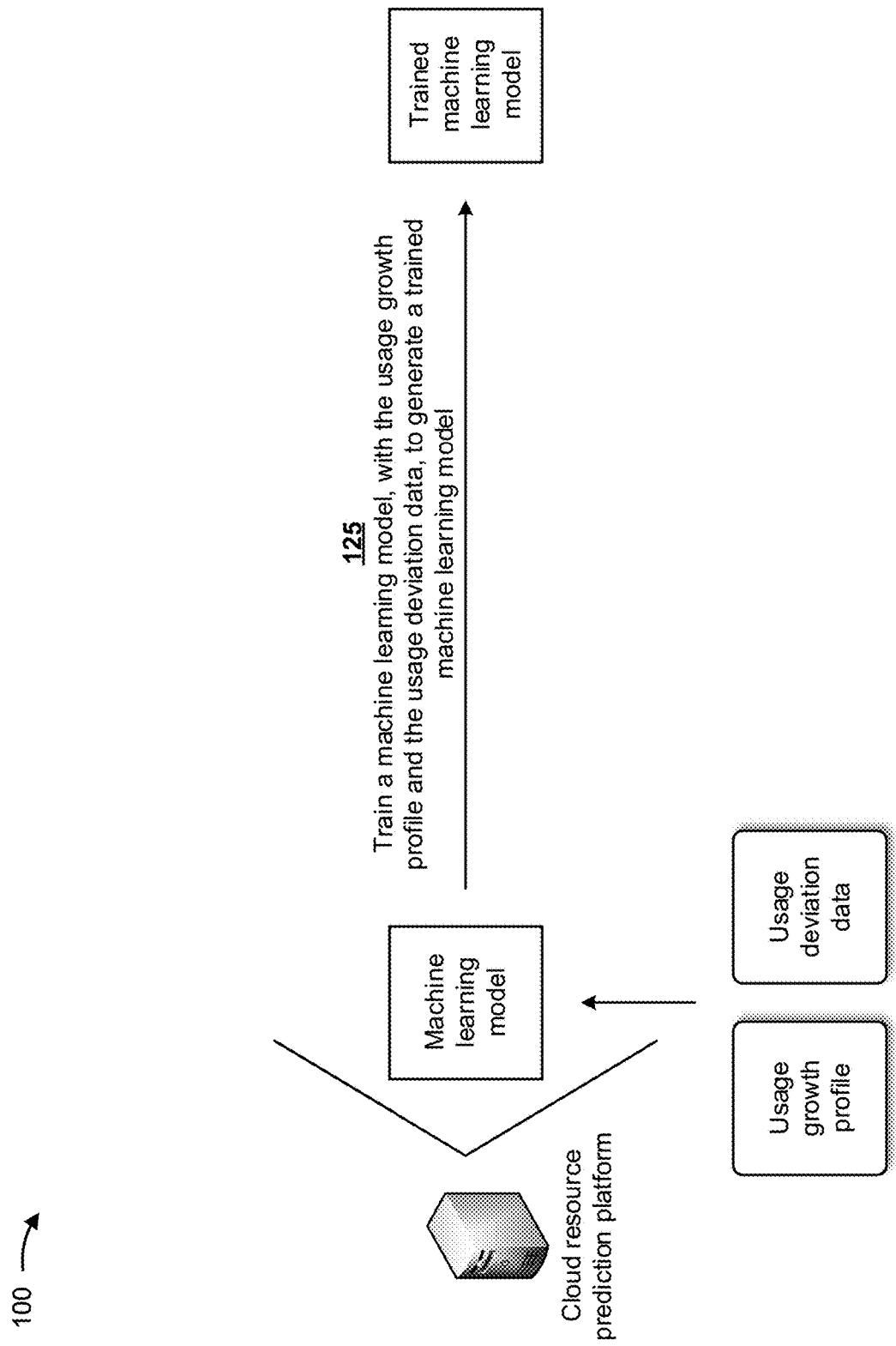

As shown in FIG. 1D, and by reference number 125, the cloud resource prediction platform may train a machine learning model, with the usage growth profile and the usage deviation data, to generate a trained machine learning model. In some implementations, the machine learning model may include a Monte Carlo simulation model. The Monte Carlo simulation model may include a model that relies on repeated random samplings of data to obtain numerical results. The underlying concept is to use randomness to solve problems that might be deterministic in principle. The Monte Carlo simulation model may be used to solve optimization problems, numerical integration problems, problems generating draws from a probability distribution, and/or the like.

The trained machine learning model may be utilized by the cloud resource prediction platform to determine projected resource usage data (e.g., related to resource usage by a new customer or new resource usage by an existing customer) based on a request for a new resource from a cloud computing environment (e.g., received from a client device associated with the new customer or the existing customer). In the case of processing new data related to the new customer or the existing customer, the cloud resource prediction platform may utilize the trained machine learning model to identify similar customers (e.g., based on having similar characteristics), and to make a prediction of resource usage by the customer based on data (e.g., historical resource usage) related to the similar customers.

In some implementations, the cloud resource prediction platform may separate the usage growth profile and the usage deviation data into a training set, a validation set, a test set, and/or the like. The training set may be utilized to train the machine learning model. The validation set may be utilized to validate results of the trained machine learning model. The test set may be utilized to test operation of the trained machine learning model.

In some implementations, the cloud resource prediction platform may train the machine learning model using, for example, an unsupervised training procedure and based on the usage growth profile and the usage deviation data. For example, the cloud resource prediction platform may perform dimensionality reduction to reduce the usage growth profile and the usage deviation data to a minimum feature set, thereby reducing resources (e.g., processing resources, memory resources, and/or the like) to train the machine learning model, and may apply a classification technique to the minimum feature set.

In some implementations, the cloud resource prediction platform may use a logistic regression classification technique to determine a categorical outcome (e.g., whether a threshold quantity of resources is predicted to be needed, whether a requested quantity of resources is sufficient for a task, and/or the like). Additionally, or alternatively, the cloud resource prediction platform may use a naïve Bayesian classifier technique. In this case, the cloud resource prediction platform may perform binary recursive partitioning to split the usage growth profile and the usage deviation data into partitions and/or branches and use the partitions and/or branches to determine outcomes (e.g., whether a threshold quantity of resources is predicted to be needed, whether a requested quantity of resources is sufficient for a task, and/or the like). Based on using recursive partitioning, the cloud resource prediction platform may reduce utilization of computing resources relative to manual, linear sorting and analysis of data points, thereby enabling use of thousands, millions, or billions of data points to train the machine learning model, which may result in more accurate models than using fewer data points.

Additionally, or alternatively, the cloud resource prediction platform may use a support vector machine (SVM) classifier technique to generate a non-linear boundary between data points in the training set. In this case, the non-linear boundary is used to classify test data into a particular class.

Additionally, or alternatively, the cloud resource prediction platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the cloud resource prediction platform may use one or more other model training techniques, such as a neural network technique, a latent semantic indexing technique, and/or the like. For example, the cloud resource prediction platform may perform an artificial neural network processing technique (e.g., using a two-layer feedforward neural network architecture, a three-layer feedforward neural network architecture, and/or the like) to perform pattern recognition with regard to patterns of the usage growth profile and the usage deviation data. In this case, using the artificial neural network processing technique may improve an accuracy of the trained machine learning model generated by the cloud resource prediction platform by being more robust to noisy, imprecise, or incomplete data, and by enabling the cloud resource prediction platform to detect patterns and/or trends undetectable to human analysts or systems using less complex techniques.

In some implementations, rather than training a model, the cloud resource prediction platform may receive a model from another device (e.g., a server device). For example, a server device may generate a model based on having trained the model in a manner similar to that described above and may provide the model to the cloud resource prediction platform (e.g., may pre-load the cloud resource prediction platform with the model, may receive a request from the cloud resource prediction platform for the model, and/or the like). The cloud resource prediction platform may perform a lookup to identify a model for a customer with particular characteristics, for a particular task for which resources are to be used, and/or the like. For example, the cloud resource prediction platform may perform a lookup of a model based on one or more characteristics of a customer and/or a task. In other words, the cloud resource prediction platform may utilize various models to make different predictions related to resource usage, thereby increasing an accuracy of making resource usage-related predictions.

Figure 1E:
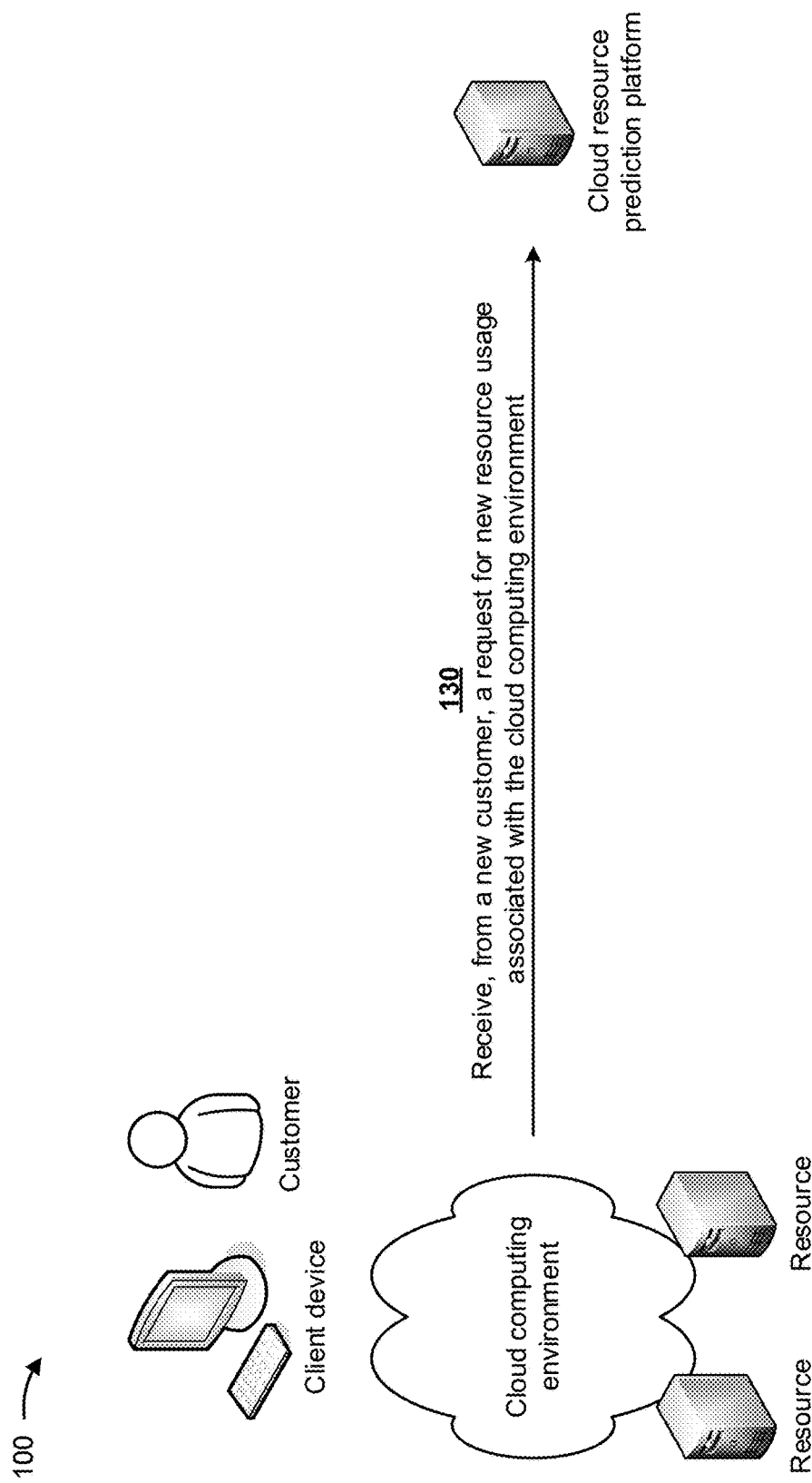

As shown in FIG. 1E, and by reference number 130, the cloud resource prediction platform may receive, from a client device associated with a new customer or an existing customer, a request for new resource usage associated with the cloud computing environment. The cloud computing environment may include resources (e.g., computing resources, processing resources, memory resources, network resources, and/or the like) and may be associated with the client device of the customer. In some implementations, the cloud resource prediction platform may receive the request for new resource usage from, for example, the client device, one or more of the resources, and/or the like. The request for new resource usage may include information identifying characteristics of the customer, tasks for which the resources are to be used, a quantity of resources that have been requested by the customer, and/or the like.

Figure 1F:
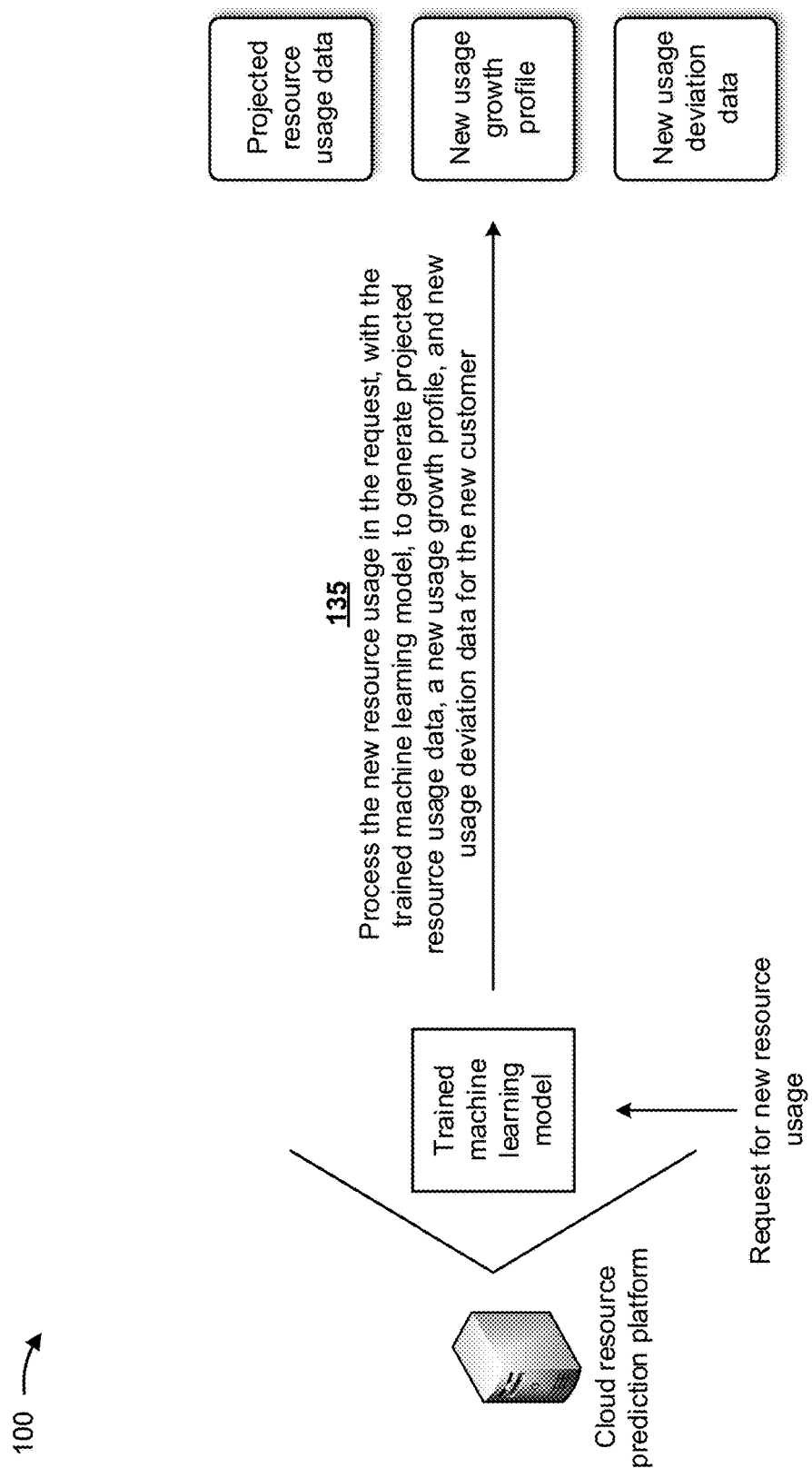

As shown in FIG. 1F, and by reference number 135, the cloud resource prediction platform may process the new resource usage requested in the request, with the trained machine learning model, to generate projected resource usage data, a new usage growth profile, and new usage deviation data for the new customer. In some implementations, the projected resource usage data may include data identifying a projected resource usage for the customer, a range of projected resource usage for the customer (e.g., a low or tenth percentile resource usage, a medium or a fiftieth percentile resource usage, and a high or a ninetieth percentile resource usage), and/or the like. The new usage growth profile may include a set of groupings of data associated with the new customer (e.g., data groupings) based on a set of attributes included in the data associated with the new customer. For example, the new usage growth profile may group the data associated with the new customer based on a predicted quantity of transient virtual machines utilized by the new customer, a predicted quantity of virtual machines to be continuously utilized by the new customer, a virtual machine transition probability for the new customer, and/or the like. The new usage deviation data may include data identifying a deviation between a quantity of resources requested or estimated by the new customer and a predicted quantity of resources to be utilized by the new customer.

The trained machine learning model may perform various simulations of resource usage based on the new resource usage requested in the request. For example, the trained machine learning model may perform a Monte Carlo simulation for different possible resource usages based on having been trained with the usage growth profile and the usage deviation data. As specific examples, the trained machine learning model may perform simulations related to when resources are likely to be brought online and/or taken offline, a quantity of tasks for which the resources are to be used, a quantity of resources to be used, combinations of resources to be used, and/or the like. The cloud resource prediction platform may perform thousands, millions, or more simulations and may generate a prediction based on a probability distribution of the results of the simulations, an average result of the simulations, a weighted result of the simulations, and/or the like.

Figure 1G:
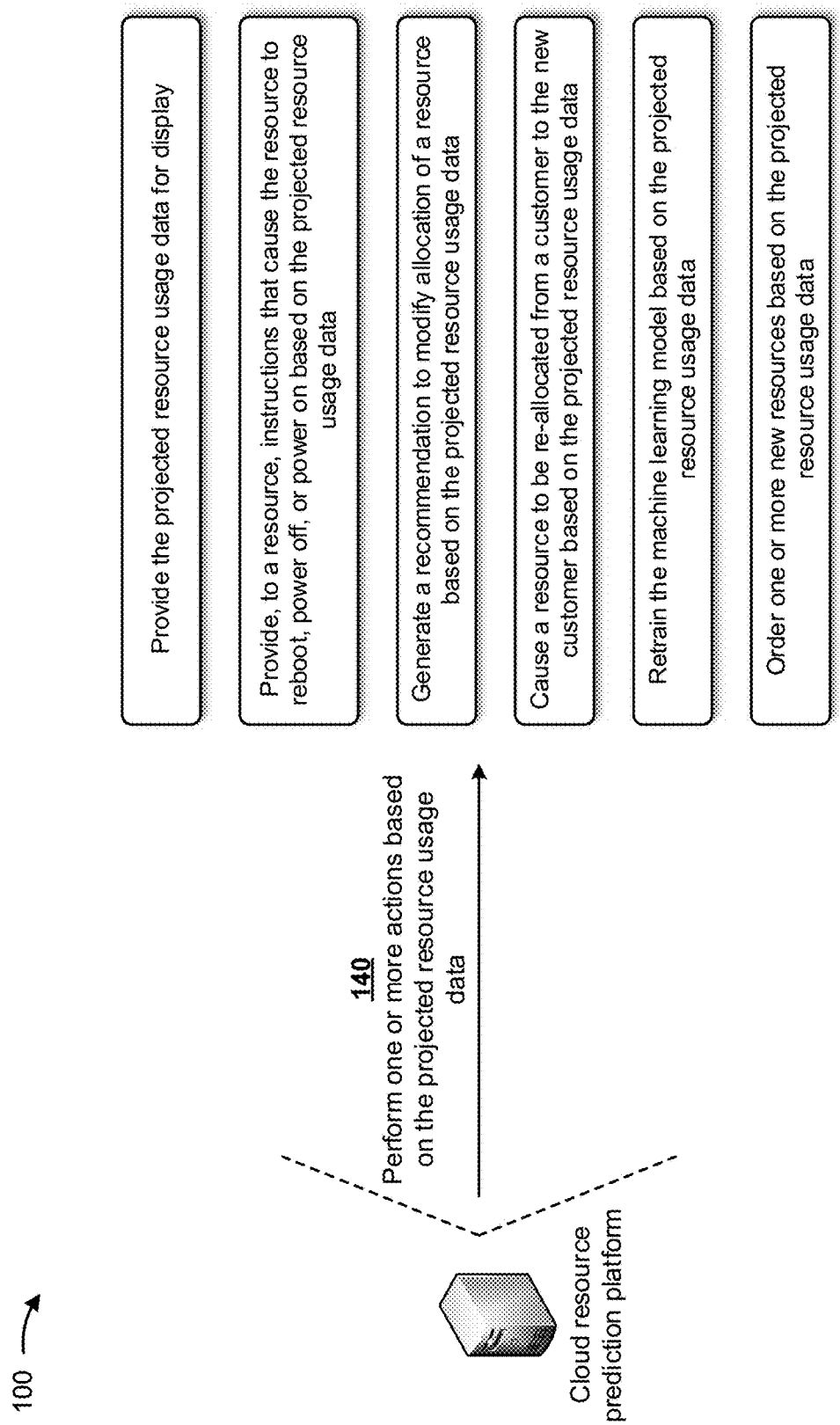

As shown in FIG. 1G, and by reference number 140, the cloud resource prediction platform may perform one or more actions based on the projected resource usage data. In some implementations, the one or more actions may include the cloud resource prediction platform providing the projected resource usage data for display. In this way, the cloud resource prediction platform may alert individuals responsible for managing resource usage, and the individuals may allocate resources for the customer and conserve resources in the future. In some implementations, the cloud resource prediction platform may provide, for display, information identifying the new usage growth profile and/or the new usage deviation data.

In some implementations, the one or more actions may include the cloud resource prediction platform providing, to a resource, instructions that cause the resource to reboot, power off, or power on based on the projected resource usage data. In this way, the cloud resource prediction platform may better control usage of the resource and prevent underutilization or overutilization of the resource. For example, the resource may be rebooted so that the resource may be utilized by the new customer.

In some implementations, the one or more actions may include the cloud resource prediction platform generating a recommendation to modify allocation of a resource for the new customer based on the projected resource usage data. For example, the cloud resource prediction platform may generate a recommendation based on an amount by which a predicted usage deviates from a requested usage, and may provide information for display, in a message to a client device, and/or the like, that identifies the recommendation. In this way, the cloud resource prediction platform may provide the recommendation to individuals responsible for managing resource usage, and the individuals may address the recommendation and conserve resources in the future.

In some implementations, the one or more actions may include the cloud resource prediction platform causing a resource to be reallocated from a customer to the new customer based on the projected resource usage data. For example, the cloud resource prediction platform may reallocate a resource, being underutilized by a customer, to the new customer that will utilize the resource. In this way, resources are more efficiently allocated and experience less idle time.

In some implementations, the one or more actions may include the cloud resource prediction platform retraining the machine learning model based on the projected resource usage data. In this way, the machine learning model may better predict new resource usage associated with the cloud computing environment.

In some implementations, the one or more actions may include the cloud resource prediction platform ordering one or more new resources based on the projected resource usage data. For example, the cloud resource prediction platform may order a new server device for the cloud computing environment to service the resource usage predicted for the new customer.

In some implementations, the cloud resource prediction platform may determine a reallocation of the resources of the cloud computing environment based on the projected resource usage data, and may cause the reallocation of the resources to be implemented by the cloud computing environment (e.g., configure the resources to be able to communicate with correct client devices).

In some implementations, the cloud resource prediction platform may identify a type of resource, and may determine a quantity of usage time of a resource and a quantity of tasks performed by a resource. The cloud resource prediction platform may determine a reallocation for the resources based on the type of the resource, the quantity of usage time of the resource, and the quantity of tasks performed by the resource, and may cause the reallocation to be implemented by the cloud computing environment.

In some implementations, the cloud resource prediction platform may monitor resource usage over time for the new customer and may output corresponding results of monitoring the resource usage of the customer.

In some implementations, the cloud resource prediction platform may schedule resources for usage by the new customer based on a prediction (e.g., by sending a message to a server device that controls allocation of the resources, by identifying available times for the resources using an electronic schedule, by configuring the server device, and/or the like).

In this way, several different stages of the process for predicting a quantity of cloud resources to allocate to a customer may be automated via a machine learning model, which may improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique that utilizes a machine learning model to predict a quantity of cloud resources to allocate to a customer. Further, the process for utilizing a machine learning model to predict a quantity of cloud resources to allocate to a customer conserves resources (e.g., processing resources, memory resources, network resources, and/or the like) that would otherwise be wasted in poor management of resource usage, mis-allocation of resources, overuse of resources, and/or the like.

As indicated above, FIGS. 1A-1G are provided merely as examples. Other examples may differ from what is described with regard to FIGS. 1A-1G.

Figure 2:
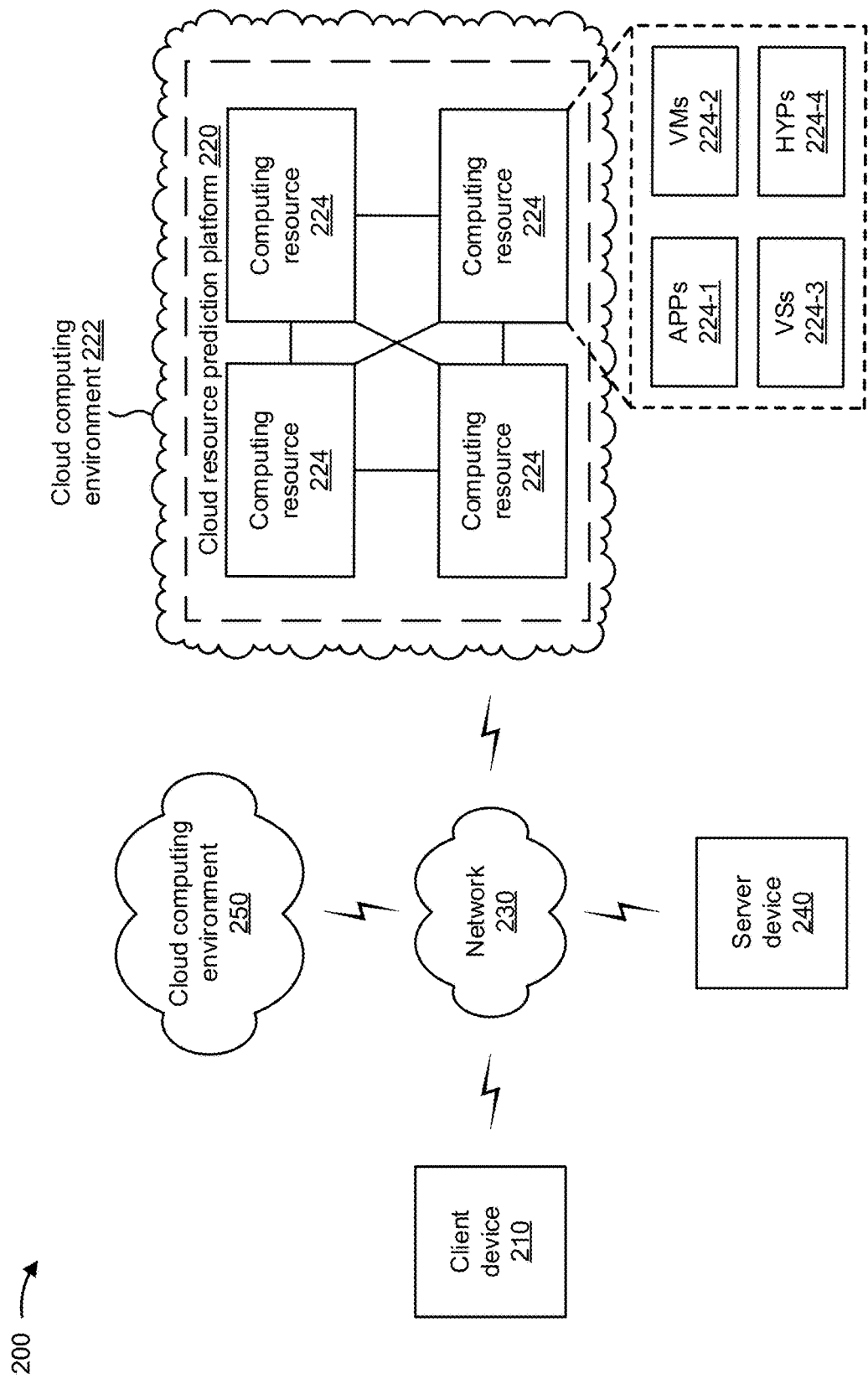
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a cloud resource prediction platform 220, a network 230, a server device 240, and a cloud computing environment 250. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to cloud resource prediction platform 220 and/or server device 240.

Cloud resource prediction platform 220 includes one or more devices that utilize a machine learning model to predict a quantity of cloud resources to allocate to a customer. In some implementations, cloud resource prediction platform 220 may be designed to be modular such that certain software components may be swapped in or out depending on a particular need. As such, cloud resource prediction platform 220 may be easily and/or quickly reconfigured for different uses. In some implementations, cloud resource prediction platform 220 may receive information from and/or transmit information to one or more client devices 210 and/or server devices 240.

In some implementations, as shown, cloud resource prediction platform 220 may be hosted in a cloud computing environment 222. Notably, while implementations described herein describe cloud resource prediction platform 220 as being hosted in cloud computing environment 222, in some implementations, cloud resource prediction platform 220 may not be cloud-based (i.e., may be implemented outside of a cloud computing environment) or may be partially cloud-based.

Cloud computing environment 222 includes an environment that hosts cloud resource prediction platform 220. Cloud computing environment 222 may provide computation, software, data access, storage, etc., services that do not require end-user knowledge of a physical location and configuration of system(s) and/or device(s) that hosts cloud resource prediction platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host cloud resource prediction platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with cloud resource prediction platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 and/or server device 240 or an operator of cloud resource prediction platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with an entity as described above. In some implementations, server device 240 may receive information from and/or transmit information to client device 210 and/or cloud resource prediction platform 220.

Cloud computing environment 250 includes an environment that hosts cloud resources, and may include the features of cloud computing environment 222, described above.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
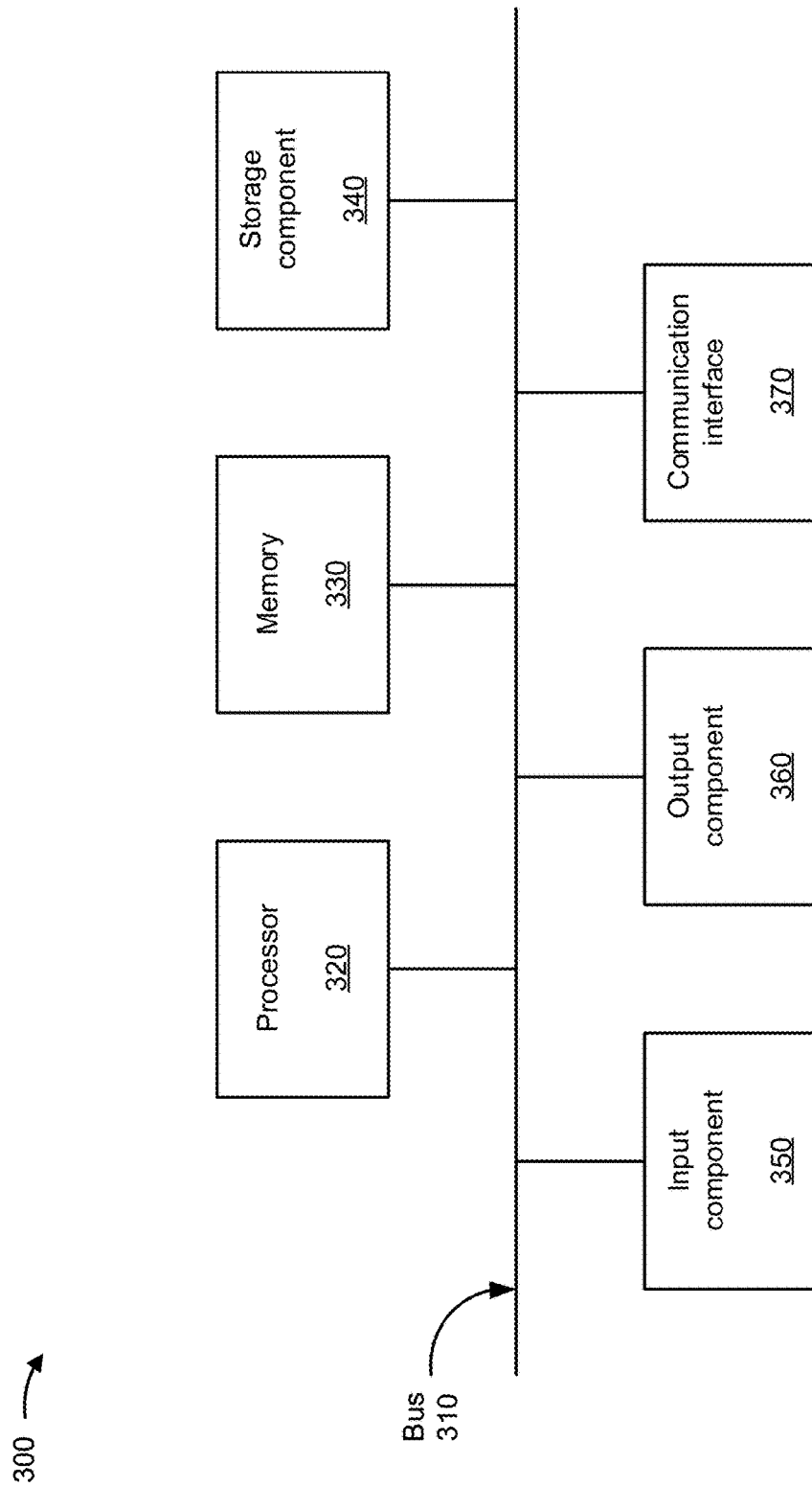
FIG. 3 is a diagram of example components of one or more devices of FIG. 2.

FIG. 3 is a diagram of example components of a device 300. Device 300 may correspond to client device 210, cloud resource prediction platform 220, computing resource 224, and/or server device 240. In some implementations, client device 210, cloud resource prediction platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
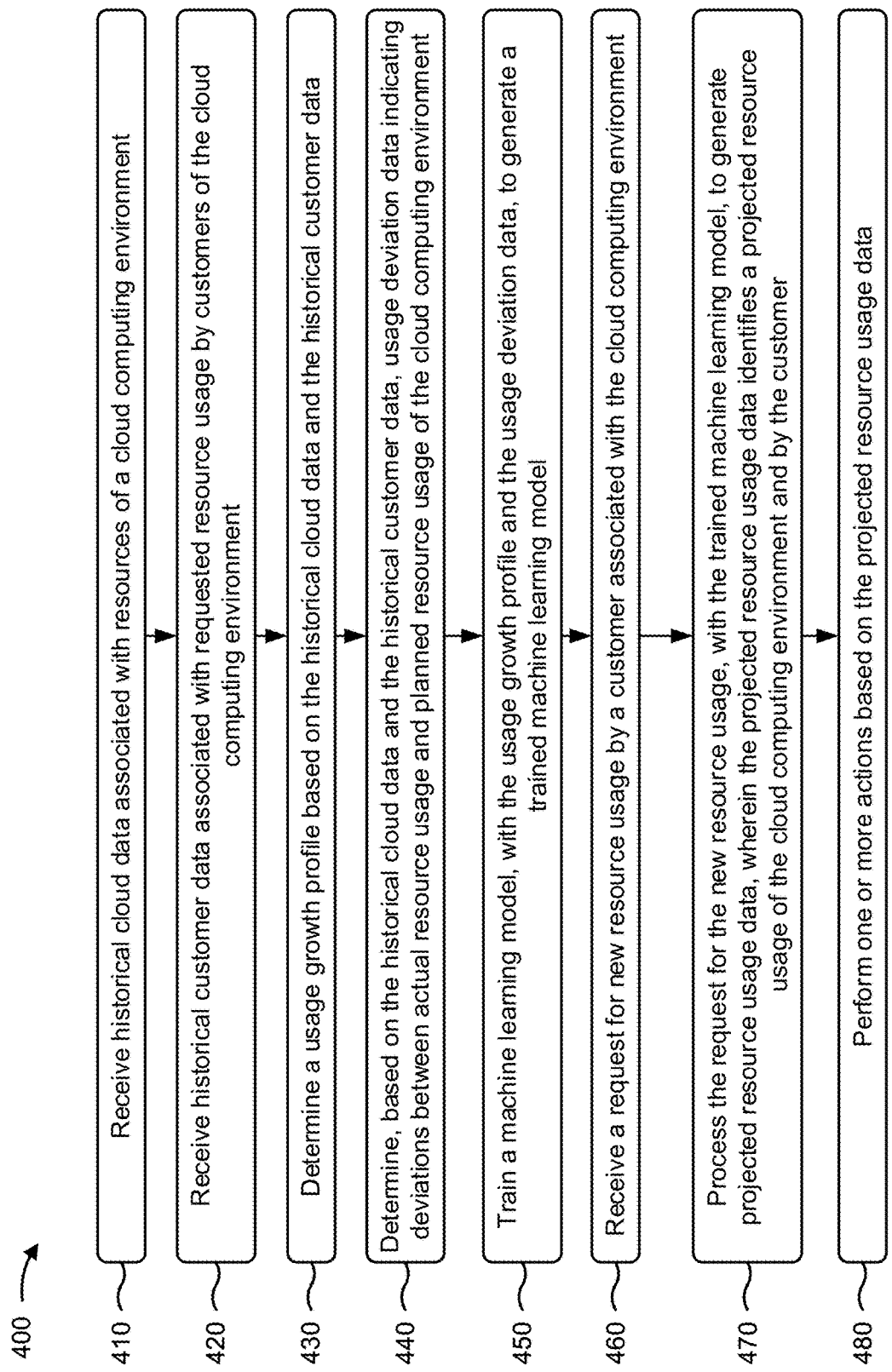

FIG. 4 is a flow chart of an example process 400 for utilizing a machine learning model to predict a quantity of cloud resources to allocate to a customer. In some implementations, one or more process blocks of FIG. 4 may be performed by a cloud resource prediction platform (e.g., cloud resource prediction platform 220). In some implementations, one or more process blocks of FIG. 4 may be performed by another device or a group of devices separate from or including the cloud resource prediction platform, such as a client device (e.g., client device 210) and/or a server device (e.g., server device 240).

As shown in FIG. 4, process 400 may include receiving historical cloud data associated with resources of a cloud computing environment (block 410). For example, the cloud resource prediction platform (e.g., using computing resource 224, processor 320, communication interface 370, and/or the like) may receive historical cloud data associated with resources of a cloud computing environment, as described above.

As further shown in FIG. 4, process 400 may include receiving historical customer data associated with requested resource usage by customers of the cloud computing environment (block 420). For example, the cloud resource prediction platform (e.g., using computing resource 224, processor 320, input component 350, communication interface 370, and/or the like) may receive historical customer data associated with requested resource usage by customers of the cloud computing environment, as described above.

As further shown in FIG. 4, process 400 may include determining a usage growth profile based on the historical cloud data and the historical customer data (block 430). For example, the cloud resource prediction platform (e.g., using computing resource 224, processor 320, memory 330, and/or the like) may determine a usage growth profile based on the historical cloud data and the historical customer data, as described above.

As further shown in FIG. 4, process 400 may include determining, based on the historical cloud data and the historical customer data, usage deviation data indicating deviations between actual resource usage and planned resource usage of the cloud computing environment (block 440). For example, the cloud resource prediction platform (e.g., using computing resource 224, processor 320, storage component 340, and/or the like) may determine, based on the historical cloud data and the historical customer data, usage deviation data indicating deviations between actual resource usage and planned resource usage of the cloud computing environment, as described above.

As further shown in FIG. 4, process 400 may include training a machine learning model, with the usage growth profile and the usage deviation data, to generate a trained machine learning model (block 450). For example, the cloud resource prediction platform (e.g., using computing resource 224, processor 320, memory 330, and/or the like) may train a machine learning model, with the usage growth profile and the usage deviation data, to generate a trained machine learning model, as described above.

As further shown in FIG. 4, process 400 may include receiving a request for new resource usage by a customer associated with the cloud computing environment (block 460). For example, the cloud resource prediction platform (e.g., using computing resource 224, processor 320, communication interface 370, and/or the like) may receive a request for new resource usage by a customer associated with the cloud computing environment, as described above.

As further shown in FIG. 4, process 400 may include processing the request for the new resource usage, with the trained machine learning model, to generate projected resource usage data, wherein the projected resource usage data identifies a projected resource usage of the cloud computing environment and by the customer (block 470). For example, the cloud resource prediction platform (e.g., using computing resource 224, processor 320, memory 330, and/or the like) may process the request for the new resource usage, with the trained machine learning model, to generate projected resource usage data, as described above. In some implementations, the projected resource usage data may identify a projected resource usage of the cloud computing environment and by the customer.

As further shown in FIG. 4, process 400 may include performing one or more actions based on the projected resource usage data (block 480). For example, the cloud resource prediction platform (e.g., using computing resource 224, processor 320, memory 330, storage component 340, communication interface 370, and/or the like) may perform one or more actions based on the projected resource usage data, as described above.

Process 400 may include additional implementations, such as any single implementation or any combination of implementations described below and/or in connection with one or more other processes described elsewhere herein.

In a first implementation, the usage growth profile may include data groupings of the historical cloud data and the historical customer data based on a set of attributes included in the historical cloud data and the historical customer data.

In a second implementation, alone or in combination with the first implementation, the set of attributes may include one or more of an attribute identifying types of the resources of the cloud computing environment, an attribute identifying tasks for which the resources are organized, an attribute identifying users of the resources, or an attribute identifying costs associated with the resources.

In a third implementation, alone or in combination with one or more of the first and second implementations, the historical cloud data may include data identifying one or more of types of the resources of the cloud computing environment that are used by each of the customers, quantities of the resources that are used by each of the customers, times of day or days of a week when the resources are used by each of the customers, or costs associated with the resources that are used by each the customers.

In a fourth implementation, alone or in combination with one or more of the first through third implementations, the historical customer data may include data identifying one or more of quantities of the resources of the cloud computing environment requested by each of the customers, estimations for allocation and usage of the resources by each of the customers, or characteristics of each of the customers.

In a fifth implementation, alone or in combination with one or more of the first through fourth implementations, when performing the one or more actions, the cloud resource prediction platform may provide the projected resource usage data for display; may provide, to a resource, instructions that cause the at least one of the resources to reboot, power off, or power on based on the projected resource usage data; may generate a recommendation to modify an allocation of the at least one of the resources based on the projected resource usage data; and/or the like.

In a sixth implementation, alone or in combination with one or more of the first through fifth implementations, when performing the one or more actions, the cloud resource prediction platform may cause a resource to be reallocated from one of the customers to the customer based on the projected resource usage data, may retrain the machine learning model based on the projected resource usage data, may order a new resource based on the projected resource usage data, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing a machine learning model to predict a quantity of cloud resources to allocate to a customer. In some implementations, one or more process blocks of FIG. 5 may be performed by a cloud resource prediction platform (e.g., cloud resource prediction platform 220). In some implementations, one or more process blocks of FIG. 5 may be performed by another device or a group of devices separate from or including the cloud resource prediction platform, such as a client device (e.g., client device 210) and/or a server device (e.g., server device 240).

As shown in FIG. 5, process 500 may include receiving a request for new resource usage by a customer associated with a cloud computing environment wherein the cloud computing environment includes resources (block 510). For example, the cloud resource prediction platform (e.g., using computing resource 224, processor 320, communication interface 370, and/or the like) may receive a request for new resource usage by a customer associated with a cloud computing environment and wherein the cloud computing environment includes resources, as described above. In some implementations, the cloud computing environment includes resources.

As further shown in FIG. 5, process 500 may include processing the request for the new resource usage, with a machine learning model, to generate projected resource usage data, wherein the machine learning model is trained based on a usage growth profile determined based on historical cloud data associated with the resources of the cloud computing environment and based on historical customer data associated with requested resource usage by customers of the cloud computing environment, and usage deviation data determined based on processing the historical cloud data and the historical customer data with a model, wherein the usage deviation data indicates deviations between actual resource usage and planned resource usage of the cloud computing environment, and wherein the projected resource usage data identifies a projected resource usage of the cloud computing environment and by the customer (block 520). For example, the cloud resource prediction platform (e.g., using computing resource 224, processor 320, memory 330, storage component 340, communication interface 370, and/or the like) may process the request for the new resource usage, with a machine learning model, to generate projected resource usage data, as described above. In some implementations, the machine learning model may be trained based on a usage growth profile determined based on historical cloud data associated with the resources of the cloud computing environment and based on historical customer data associated with requested resource usage by customers of the cloud computing environment, and usage deviation data determined based on processing the historical cloud data and the historical customer data with a model. In some implementations, the usage deviation data may indicate deviations between actual resource usage and planned resource usage of the cloud computing environment. In some implementations, the projected resource usage data may identify a projected resource usage of the cloud computing environment and by the customer.

As further shown in FIG. 5, process 500 may include performing one or more actions based on the projected resource usage data (block 530). For example, the cloud resource prediction platform (e.g., using computing resource 224, processor 320, memory 330, storage component 340, communication interface 370, and/or the like) may perform one or more actions based on the projected resource usage data, as described above.

Process 500 may include additional implementations, such as any single implementation or any combination of implementations described below and/or in connection with one or more other processes described elsewhere herein.

In a first implementation, the model may include a non-parametric probability estimation model with Bayesian smoothing, and the machine learning model may include a Monte Carlo simulation model.

In a second implementation, alone or in combination with the first implementation, the one or more processors, when processing the request for the new resource usage, the cloud resource prediction platform may perform multiple Monte Carlo simulations, based on the request for the new resource usage, to generate multiple results, and may determine the projected resource usage data based on the multiple results.

In a third implementation, alone or in combination with one or more of the first and second implementations, when performing the one or more actions, the cloud resource prediction platform may determine a reallocation of the resources of the cloud computing environment based on the projected resource usage data, and may cause the reallocation of the resources to be implemented by the cloud computing environment.

In a fourth implementation, alone or in combination with one or more of the first through third implementations, the resources of the cloud computing environment may include one or more of processor resources utilized by each of the customers, memory resources utilized by each of the customers, or network resources utilized by each of the customers.

In a fifth implementation, alone or in combination with one or more of the first through fourth implementations, when performing the one or more actions, the cloud resource prediction platform may monitor usage of the resources over time by the customer, and may provide corresponding results of monitoring the usage of the resources by the customer.

In a sixth implementation, alone or in combination with one or more of the first through fifth implementations, when performing the one or more actions, the cloud resource prediction platform may schedule one or more of the resources for usage by the customer based on the projected resource usage data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing a machine learning model to predict a quantity of cloud resources to allocate to a customer. In some implementations, one or more process blocks of FIG. 6 may be performed by a cloud resource prediction platform (e.g., cloud resource prediction platform 220). In some implementations, one or more process blocks of FIG. 6 may be performed by another device or a group of devices separate from or including the cloud resource prediction platform, such as a client device (e.g., client device 210) and/or a server device (e.g., server device 240).

As shown in FIG. 6, process 600 may include receiving historical cloud data associated with resources of a cloud computing environment, wherein the historical cloud data includes data identifying one or more of types of the resources of the cloud computing environment that are used by each of customers of the cloud computing environment, quantities of the resources that are used by each of the customers, times of day or days of a week when the resources are used by each of the customers, or costs associated with the resources that are used by each of the customers (block 610). For example, the cloud resource prediction platform (e.g., using computing resource 224, processor 320, communication interface 370, and/or the like) may receive historical cloud data associated with resources of a cloud computing environment, as described above. In some implementations, the historical cloud data may include data identifying one or more of types of the resources of the cloud computing environment that are used by each of customers of the cloud computing environment, quantities of the resources that are used by each of the customers, times of day or days of a week when the resources are used by each of the customers, or costs associated with the resources that are used by each of the customers.

As further shown in FIG. 6, process 600 may include receiving historical customer data associated with requested resource usage by the customers, wherein the historical customer data includes data identifying one or more of quantities of the resources of the cloud computing environment requested by the each of customers, estimations for allocation and usage of the resources by each of the customers, or characteristics of each of the customers (block 620). For example, the cloud resource prediction platform (e.g., using computing resource 224, processor 320, communication interface 370, and/or the like) may receive historical customer data associated with requested resource usage by the customers, as described above. In some implementations, the historical customer data may include data identifying one or more of quantities of the resources of the cloud computing environment requested by the each of customers, estimations for allocation and usage of the resources by each of the customers, or characteristics of each of the customers.

As further shown in FIG. 6, process 600 may include determining a usage growth profile based on the historical cloud data and the historical customer data (block 630). For example, the cloud resource prediction platform (e.g., using computing resource 224, processor 320, memory 330, and/or the like) may determine a usage growth profile based on the historical cloud data and the historical customer data, as described above.

As further shown in FIG. 6, process 600 may include processing the historical cloud data and the historical customer data, with a model, to determine usage deviation data indicating deviations between actual resource usage and planned resource usage of the cloud computing environment (block 640). For example, the cloud resource prediction platform (e.g., using computing resource 224, processor 320, storage component 340, and/or the like) may process the historical cloud data and the historical customer data, with a model, to determine usage deviation data indicating deviations between actual resource usage and planned resource usage of the cloud computing environment, as described above.

As further shown in FIG. 6, process 600 may include training a machine learning model, with the usage growth profile and the usage deviation data, in order to generate a trained machine learning model (block 650). For example, the cloud resource prediction platform (e.g., using computing resource 224, processor 320, memory 330, and/or the like) may train a machine learning model, with the usage growth profile and the usage deviation data, in order to generate a trained machine learning model, as described above.

As further shown in FIG. 6, process 600 may include receiving a request for new resource usage by a customer associated with the cloud computing environment (block 660). For example, the cloud resource prediction platform (e.g., using computing resource 224, processor 320, input component 350, communication interface 370, and/or the like) may receive a request for new resource usage by a customer associated with the cloud computing environment, as described above.

As further shown in FIG. 6, process 600 may include processing the request for the new resource usage, with the trained machine learning model, to generate projected resource usage data, wherein the projected resource usage data identifies a projected resource usage of the cloud computing environment and by the customer (block 670). For example, the cloud resource prediction platform (e.g., using computing resource 224, processor 320, memory 330, storage component 340, and/or the like) may process the request for the new resource usage, with the trained machine learning model, to generate projected resource usage data, as described above. In some implementations, the projected resource usage data may identify a projected resource usage of the cloud computing environment and by the customer.

As further shown in FIG. 6, process 600 may include performing one or more actions based on the projected resource usage data (block 680). For example, the cloud resource prediction platform (e.g., using computing resource 224, processor 320, memory 330, storage component 340, output component 360, communication interface 370, and/or the like) may perform one or more actions based on the projected resource usage data, as described above.

Process 600 may include additional implementations, such as any single implementation or any combination of implementations described below and/or in connection with one or more other processes described elsewhere herein.

In a first implementation, the usage growth profile may include data groupings of the historical cloud data and the historical customer data based on a set of attributes included in the historical cloud data and the historical customer data. In some implementations, the set of attributes may include one or more of an attribute identifying types of the resources of the cloud computing environment, an attribute identifying tasks for which the resources are organized, an attribute identifying users of the resources, or an attribute identifying costs associated with the resources.

In a second implementation, alone or in combination with the first implementation, when performing the one or more actions, the cloud resource prediction platform may provide the projected resource usage data for display; may provide, to a resource, instructions that cause the at least one of the resources to reboot, power off, or power on based on the projected resource usage data; may generate a recommendation to modify an allocation of the at least one of the resources based on the projected resource usage data; and/or the like.

In a third implementation, alone or in combination with one or more of the first and second implementations, when performing the one or more actions, the cloud resource prediction platform may cause a resource to be reallocated from one of the customers to the customer based on the projected resource usage data, may retrain the machine learning model based on the projected resource usage data, may order a new resource based on the projected resource usage data, and/or the like.

In a fourth implementation, alone or in combination with one or more of the first through third implementations, when processing the request for the new resource usage, the cloud resource prediction platform may perform multiple Monte Carlo simulations, based on the request for the new resource usage, to generate multiple results, and may determine the projected resource usage data based on the multiple results.

In a fifth implementation, alone or in combination with one or more of the first through fourth implementations, when performing the one or more actions, the cloud resource prediction platform may determine a reallocation of the resources of the cloud computing environment based on the projected resource usage data, and may cause the reallocation of the resources to be implemented by the cloud computing environment.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, historical cloud data associated with resources of a cloud computing environment;
   receiving, by the device, historical customer data associated with requested resource usage by customers of the cloud computing environment;
   determining, by the device, a usage growth profile based on the historical cloud data and the historical customer data;
   determining, by the device and based on the historical cloud data and the historical customer data, usage deviation data indicating deviations between actual resource usage and planned resource usage of the cloud computing environment;
   training, by the device, a machine learning model, with the usage growth profile and the usage deviation data, to generate a trained machine learning model;
   receiving, by the device, a request for new resource usage by a customer associated with the cloud computing environment;
   processing, by the device, the request for the new resource usage, with the trained machine learning model, to generate projected resource usage data,
      wherein the projected resource usage data identifies a projected resource usage of the cloud computing environment and by the customer; and
   performing, by the device, one or more actions based on the projected resource usage data.

2. The method of claim 1, wherein the usage growth profile includes data groupings of the historical cloud data and the historical customer data based on a set of attributes included in the historical cloud data and the historical customer data.

3. The method of claim 2, wherein the set of attributes include one or more of:
   an attribute identifying types of the resources of the cloud computing environment,
   an attribute identifying tasks for which the resources are organized,
   an attribute identifying users of the resources, or
   an attribute identifying costs associated with the resources.

4. The method of claim 1, wherein the historical cloud data includes data identifying one or more of:
   types of the resources of the cloud computing environment that are used by each of the customers,
   quantities of the resources that are used by each of the customers,
   times of day or days of a week when the resources are used by each of the customers, or
   costs associated with the resources that are used by each of the customers.

5. The method of claim 1, wherein the historical customer data includes data identifying one or more of:
   quantities of the resources of the cloud computing environment requested by each of the customers,
   estimations for allocation and usage of the resources by each of the customers, or
   characteristics of each of the customers.

6. The method of claim 1, wherein performing the one or more actions includes one or more of:
   providing the projected resource usage data for display;
   providing, to a resource, instructions that cause the at least one of the resources to reboot, power off, or power on based on the projected resource usage data; or
   generating a recommendation to modify an allocation of the at least one of the resources based on the projected resource usage data.

7. The method of claim 1, wherein performing the one or more actions includes one or more of:
   causing a resource to be reallocated from one of the customers to the customer based on the projected resource usage data;
   retraining the machine learning model based on the projected resource usage data; or
   ordering a new resource based on the projected resource usage data.

8. A device, comprising:
   one or more memories; and
   one or more processors, communicatively coupled to the one or more memories, configured to:
      receive a request for new resource usage by a customer associated with a cloud computing environment,
         wherein the cloud computing environment includes resources;
      process the request for the new resource usage, with a machine learning model, to generate projected resource usage data,
         wherein the machine learning model is trained based on:
            a usage growth profile determined based on historical cloud data associated with the resources of the cloud computing environment and based on historical customer data associated with requested resource usage by customers of the cloud computing environment, and
            usage deviation data determined based on processing the historical cloud data and the historical customer data, with a model,
               wherein the usage deviation data indicates deviations between actual resource usage and planned resource usage of the cloud computing environment;
         wherein the projected resource usage data identifies a projected resource usage of the cloud computing environment and by the customer; and
      perform one or more actions based on the projected resource usage data.

9. The device of claim 8, wherein:
   the model includes a non-parametric probability estimation model with Bayesian smoothing, and
   the machine learning model includes a Monte Carlo simulation model.

10. The device of claim 8, wherein the one or more processors, when processing the request for the new resource usage, are configured to:
    perform multiple Monte Carlo simulations, based on the request for the new resource usage, to generate multiple results; and
    determine the projected resource usage data based on the multiple results.

11. The device of claim 8, wherein the one or more processors, when performing the one or more actions, are configured to:
    determine a reallocation of the resources of the cloud computing environment based on the projected resource usage data; and
    cause the reallocation of the resources to be implemented by the cloud computing environment.

12. The device of claim 8, wherein the resources of the cloud computing environment include one or more of:
    processor resources utilized by each of the customers,
    memory resources utilized by each of the customers, or
    network resources utilized by each of the customers.

13. The device of claim 8, wherein the one or more processors, when performing the one or more actions, are configured to:
    monitor usage of the resources over time by the customer; and
    provide corresponding results of monitoring the usage of the resources by the customer.

14. The device of claim 8, wherein the one or more processors, when performing the one or more actions, are configured to:
    schedule one or more of the resources for usage by the customer based on the projected resource usage data.

15. A non-transitory computer-readable medium storing instructions, the instructions comprising:
    one or more instructions that, when executed by one or more processors, cause the one or more processors to:
        receive historical cloud data associated with resources of a cloud computing environment,
            wherein the historical cloud data includes data identifying one or more of:
                types of the resources of the cloud computing environment that are used by each of customers of the cloud computing environment,
                quantities of the resources that are used by each of the customers,
                times of day or days of a week when the resources are used by each of the customers, or
                costs associated with the resources that are used by each of the customers;
        receive historical customer data associated with requested resource usage by the customers,
            wherein the historical customer data includes data identifying one or more of:
                quantities of the resources of the cloud computing environment requested by the each of customers,
                estimations for allocation and usage of the resources by each of the customers, or
                characteristics of each of the customers;
        determine a usage growth profile based on the historical cloud data and the historical customer data;
        process the historical cloud data and the historical customer data, with a model, to determine usage deviation data indicating deviations between actual resource usage and planned resource usage of the cloud computing environment;
        train a machine learning model, with the usage growth profile and the usage deviation data, in order to generate a trained machine learning model;
        receive a request for new resource usage by a customer associated with the cloud computing environment;
        process the request for the new resource usage, with the trained machine learning model, to generate projected resource usage data,
            wherein the projected resource usage data identifies a projected resource usage of the cloud computing environment and by the customer; and
        perform one or more actions based on the projected resource usage data.

16. The non-transitory computer-readable medium of claim 15, wherein the usage growth profile includes data groupings of the historical cloud data and the historical customer data based on a set of attributes included in the historical cloud data and the historical customer data,
    wherein the set of attributes include one or more of:
        an attribute identifying types of the resources of the cloud computing environment,
        an attribute identifying tasks for which the resources are organized,
        an attribute identifying users of the resources, or
        an attribute identifying costs associated with the resources.

17. The non-transitory computer-readable medium of claim 15, wherein the one or more instructions, that cause the one or more processors to perform the one or more actions, cause the one or more processors to one or more of:
    provide the projected resource usage data for display;
    provide, to a resource, instructions that cause the at least one of the resources to reboot, power off, or power on based on the projected resource usage data; or
    generate a recommendation to modify an allocation of the at least one of the resources based on the projected resource usage data.

18. The non-transitory computer-readable medium of claim 15, wherein the one or more instructions, that cause the one or more processors to perform the one or more actions, cause the one or more processors to one or more of:
    cause a resource to be reallocated from one of the customers to the customer based on the projected resource usage data;
    retrain the machine learning model based on the projected resource usage data; or
    order a new resource based on the projected resource usage data.

19. The non-transitory computer-readable medium of claim 15, wherein the one or more instructions, that cause the one or more processors to process the request for the new resource usage, cause the one or more processors to:
    perform multiple Monte Carlo simulations, based on the request for the new resource usage, to generate multiple results; and
    determine the projected resource usage data based on the multiple results.

20. The non-transitory computer-readable medium of claim 15, wherein the one or more instructions, that cause the one or more processors to perform the one or more actions, cause the one or more processors to:
    determine a reallocation of the resources of the cloud computing environment based on the projected resource usage data; and cause the reallocation of the resources to be implemented by the cloud computing environment.

* * * * *